(12) United States Patent
Gunasekara et al.

(10) Patent No.: US 7,821,988 B1
(45) Date of Patent: Oct. 26, 2010

(54) USE OF LOCAL WIRELESS ENERGY LEVEL AS DISPATCH SESSION CONTROL MECHANISM

(75) Inventors: Don Gunasekara, Reston, VA (US); Shane D. Chapman, Herndon, VA (US); Tom H. Wilson, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 712 days.

(21) Appl. No.: 11/772,565

(22) Filed: Jul. 2, 2007

(51) Int. Cl.
*H04W 4/00* (2009.01)
(52) U.S. Cl. .................. 370/328; 370/331; 370/318; 370/338
(58) Field of Classification Search ............. 455/518, 455/519, 517, 552.1, 426.1, 432.3; 370/328, 370/331, 332, 334, 338, 318
See application file for complete search history.

(56) References Cited

U.S. PATENT DOCUMENTS

| | | | |
|---|---|---|---|
| 2002/0137472 A1* | 9/2002 | Quinn et al. | 455/90 |
| 2005/0164681 A1* | 7/2005 | Jenkins et al. | 455/412.1 |
| 2006/0229093 A1 | 10/2006 | Bhutiani et al. | |
| 2007/0140255 A1* | 6/2007 | Gautier et al. | 370/395.5 |
| 2008/0171567 A1* | 7/2008 | Kossi et al. | 455/518 |
| 2008/0194279 A1* | 8/2008 | Choksi et al. | 455/518 |

OTHER PUBLICATIONS

Raytheon JPS Communications, "ACU Interoperability Products", http://www.jps.com/index.asp?node=88, printed from the World Wide Web on Jun. 7, 2007.
Raytheon Company: Investor Relations: News Release, http://investor.raytheon.com/phoenix.zhtml?c=84193&p=irol-newsA..., Oct. 27, 2004, printed from the World Wide Web.
"Interop Without Breaking the Bank," http://mrtmag.com/mag/radio_interop_without_breaking/, Jun. 1, 2005, printed from the World Wide Web.
ODP, "Developing Multi-Agency Interoperability Communications Systems: User's Handbook," ACU/TRP-1000 Handbook, Jan. 2003.

* cited by examiner

*Primary Examiner* — Jean A Gelin (57) ABSTRACT

A dispatch client device that also has a local wireless transceiver will monitor the energy level on the local transceiver side and use the energy level as a basis to function as a floor control client on a dispatch side. For example, upon receipt of a dispatch-session invitation from a dispatch server, the client may accept the invitation only if the energy level is low enough (indicating that no one is currently talking on the local side) and may then bridge the dispatch communications with the local communications, and otherwise the client may reject the invitation. As another example, if the device detects sufficient energy on the local side (indicating someone on the local side has begun talking), the device may responsively request the floor on the dispatch side and then bridge the local communications with the dispatch communications. The device may apply a standard non-squelch circuit for energy detection.

19 Claims, 5 Drawing Sheets

USE OF LOCAL WIRELESS ENERGY LEVEL AS DISPATCH SESSION CONTROL MECHANISM

FIELD OF THE INVENTION

The present invention relates to network communications and, more particularly, to inter-working dispatch communications with short range wireless communications.

BACKGROUND

Industrial/Business radio systems serve a great variety of communications needs. Organizations use their radio systems as a tool to support their business operations, safety and emergency needs. The most common implementation of these radio systems are handheld portable devices. A business hand radio has a typical range from 1-50 miles depending on the type of radio, output power, and the environment with the most common communications range of 1-5 miles.

There are a variety of situations where it would be desirable for organizations to equip workers with lower power business band radios for communications in a smaller local area, but to also occasionally connect those same users to individuals who are not within the local operating range—potentially thousands of miles away.

For example, a construction site may have workers using business band radio communications devices to communicate with each other. These devices are typically rugged and meant for use in a limited geographic area, usually to facilitate communication at a single field site. A smaller subset of the workers on the field site, however, may also carry a wireless communication device such as a cellular telephone that is equipped to engage in "push to talk" or similar wide area network dispatch communications. Such wide area network communication devices allow remote supervisors, suppliers, and others to communicate to a field site, but unfortunately only to workers on the site who are equipped with a compatible device. For many applications, and especially in urgent situations, it would be valuable to be able to communicate readily between a distant location and any worker at a field site who is equipped with only a business band handset.

SUMMARY

One mechanism to provide communication between business band handsets and a dispatch communication system, such as a push-to-talk (PTT) system for instance, is to operate an interoperability platform between the two systems. The interoperability platform may include (i) a business band radio for wirelessly communicating with other business band radios, (ii) a dispatch radio for wirelessly communicating with the dispatch communication system, and (iii) control logic for bridging the two radios together. When the interoperability platform detects that the business band radio is receiving audio from another business band radio, the platform may electronically key the PTT button on the dispatch radio and may bridge the audio from the business band radio to the dispatch radio, so as to convey the audio to the dispatch system.

A problem with such an arrangement, however, is that it does not take into account the session control signaling process typically applied in a dispatch system.

In a conventional dispatch system, such as a PTT system, a dispatch server hosting a session between multiple parties engages in floor control signaling with the parties and, through use of the signaling, allows only one party at a time to hold the floor. The server then receives speech (or other media) from the party who holds the floor, and the server transmits the speech to each of the other parties.

In typical practice, when a user wishes to initiate a dispatch session with others, the user engages a PTT button on the user's device, and the device responsively transmits to the server a session initiation request, i.e., an initial floor request. Upon receipt of the session initiation request, the server may then send corresponding session initiation requests to each other party's device. And dispatch logic on each invited device may then automatically send a positive response to the server and perhaps engage in further signaling with the server to complete setup of a session leg between the server and the invited device. Further, the server may send a positive response to the initiating party and perhaps engage in further signaling with the initiating party to complete setup a session leg between the server and the initiating party. The server would then initially grant the floor to the initiating party, so that the initiating user's speech would be conveyed to the server and from there to the other parties.

During the session, when a user wishes to take the floor, the user may engage the PTT button on the user's device, and the user's device would responsively transmit a floor request to the server. If no one else currently holds the floor, the server would then grant the floor request by sending a positive response to the requesting device, which may cause the requesting device to emit a tone signifying that the user can begin talking. On the other hand, if someone else currently holds the floor, the server may deny the floor request by sending a negative response to the requesting device.

An interoperability platform such as that noted above does not intelligently participate in such session control signaling. For example, if the dispatch server sends a session initiation request to the dispatch radio of the interoperability platform, the dispatch radio may automatically send a positive response as noted above and may thus establish a dispatch session leg with the dispatch server. However, at that time, it is possible that existing communications are ongoing on the business band side, i.e., that the business band side is currently busy. Thus, it may be inappropriate at the moment for the platform to accept the dispatch session initiation request.

As another example, when the platform detects audio received by the business band radio and the platform responsively electronically keys the PTT button on the dispatch radio so as to convey the audio to the dispatch system, it is possible that someone else already holds the floor in the dispatch system, in which case the dispatch server may deny the floor request. If that happens, notwithstanding the fact that the interoperability platform may bridge business band audio communications to the dispatch radio, the business band audio may never make it to the dispatch system and/or to the other dispatch session participants, since the interoperability platform will not hold the floor in the dispatch session.

The present invention advances by providing an interoperability device that uses local wireless energy level as a mechanism to facilitate dispatch session control signaling, rather than mere electrical keying of a PTT button or the like.

In an exemplary embodiment, the device will be a handheld portable device having a dispatch radio and a business band radio, and having control logic for using the energy level of communications received by the business band radio as a basis to engage in session control signaling via the dispatch radio with a dispatch system. In practice, when the device receives a dispatch session initiation request from the dispatch system, the device will accept the request (by generating and sending a positive response) only if the energy level being received by the business band radio is low enough to signify that business band communications are not currently ongoing. Further, when the device detects a threshold high level of energy being received by the business band radio, the device will generate and send a floor request (during a session or as a session initiation request) via the dispatch radio to the dispatch server.

Optimally, the interoperability device would be sized like a handheld cell phone for easy carrying (e.g., in a pocket or on a belt) by a user. At a construction site, for instance, a user could carry such a device so as to readily facilitate communications between business band radios on the site and remote devices that communicate through a dispatch system. Further, the interoperability device may itself also participate in the dispatch and/or business band communications. For instance, a user of the interoperability device could speak into the device, and the device could convey the user's speech via the business band radio to other business band radios and via the dispatch radio to the dispatch system for transmission in turn to other dispatch clients. Likewise, the interoperability device could output to its user the audio that the device receives from both the business band side and the dispatch side.

These as well as other aspects and advantages will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

1. Overview

An exemplary embodiment of the present invention may take various forms, examples of which include an improved portable communication device (e.g., a portable, battery-operated, handheld device) and a method carried out by such a device.

In one respect, the portable communication device may include a first transceiver that operates according to a first air interface protocol to wirelessly communicate with a radio access network that provides connectivity with a dispatch communication system, and a second transceiver that operates according to a second (different) air interface protocol to wirelessly communicate with one or more other client devices. Further, the device may include control logic for bridging communications (e.g., voice or other media) between the first transceiver and the second transceiver, and the control logic may operate to detect energy level of second air interface protocol communications received by the second transceiver and to use the detected energy level as a basis to engage in session control signaling with the dispatch communication system via the first transceiver and first air interface protocol.

In an exemplary embodiment, the first air interface protocol may comprise a wireless wide area network protocol of the type used for cellular wireless or other such communications. Examples of such protocols include, without limitation, the well known iDEN, CDMA 1xRTT, CDMA 1xEV-DO, TDMA, AMPS, GSM, GPRS, UMTS, EDGE, and WiMAX protocols. The second air interface protocol, on the other hand, may comprise a wireless local area network protocol of the type used for shorter range wireless communications. Examples of such protocols include, without limitation, the well known FRS, Wi-Fi (802.11), BLUETOOTH, and infrared protocols. In other embodiments, the first air interface protocol could be a local area network protocol and the second air interface protocol could be a wide area network protocol. Still alternatively, both could be local area network protocols or both could be wide area network protocols. Further, other types of air interface protocols, characterized in other ways, could be used as well.

The control logic may take the form of processor-executed software or firmware logic and/or hardware logic. Regardless of its form, the control logic will preferably operate to carry out the functions noted above, namely, to use energy level of communications received by the second transceiver as a basis to engage in session control signaling with the dispatch system via the first transceiver.

For example, when the device receives a session initiation request via the first transceiver from the dispatch system, the control logic may automatically determine whether the detected energy level of second air interface protocol communications received (currently or in the immediate past) via the second transceiver is lower than a minimum threshold. If so, a reasonable conclusion (whether right or wrong) is that communications do not currently exist on the local (e.g., business band) side and that it would be appropriate to accept the dispatch session invitation and bridge the session through to the local side. Consequently, the control logic may responsively generate and transmit to the dispatch system via the first transceiver an affirmative response message, the control logic may then engage in further signaling via the first transceiver with the dispatch system so as to set up a dispatch session (e.g., session leg) via the first transceiver, and the control logic may transmit via the second transceiver dispatch session communications that the client device receives via the first transceiver, for receipt of the dispatch session communications by the one or more other client devices.

On the other hand, if the control logic determines that the detected energy level of second air interface protocol communications received via the second transceiver is not lower than then minimum threshold, then a reasonable assumption (again, whether right or wrong) is that communications are currently underway on the local side, so that it would not be appropriate to accept the dispatch session invitation and to bridge the session through to the local side. Consequently, in that situation the control logic may generate and transmit to the dispatch system via the first transceiver a negative response to the session initiation request.

As another example, when the control logic detects a threshold high level of energy level of second air interface protocol communications received by the second transceiver, the control logic preferably operates to automatically generate a floor request message for a dispatch communication session (whether to initiate the session or to request the floor in an existing session) and to send the floor request message via the first transceiver to the dispatch communication system. In turn, if the dispatch communication system grants the floor request, the control logic may then bridge local and dispatch communications. For instance, the control logic may transmit via the first transceiver to the dispatch communication system communications that the device receives via the second transceiver from the one or more other client devices.

For these and other embodiments, the control logic may be arranged to detect the energy level of air interface communications received by the second transceiver by applying a simple non-squelch circuit of the type well known in FRS handsets for instance. Such a circuit generally operates to cut off audible output (e.g., loudspeaker output) from the device as long as the energy level of received communications is below a threshold level and to turn on the audible output once the energy level exceeds the threshold.

For the present invention, a control signal from the non-squelch circuit that would normally function to toggle on or off the audible output of the device can be used instead (or in addition) to indicate whether the energy level of received communications is high enough to reasonably represent existing communications, and thus as a basis for engaging in dispatch session control signaling. If the non-squelch circuit indicates a threshold high energy level that would normally cause the audible output to turn on or remain on, then the control logic can sensibly reject a received dispatch floor request or can responsively request the dispatch floor. On the other hand, if the non-squelch circuit indicates a threshold low energy level that would normally cause the audible output to turn off or remain off, then the control logic can sensibly accept a received dispatch floor request.

As noted above, the exemplary device may also function as an end-user device that can itself facilitate user participation in local and/or dispatch communications. In practice, the device may receive voice communications from a user of the device and may convey those voice communications concurrently (i) via the first transceiver over the first air interface protocol to the radio access network for transmission in turn to the dispatch communication system and (ii) via the second transceiver over the second air interface protocol to the one or more other client devices. Further, the device, can output to the user both local and dispatch communications. That way, a user could not only operate the device to bridge local and dispatch communications (thus allowing other nearby devices to engage in dispatch communications via the device) but can also (perhaps concurrently) operate the device to participate in those communications.

In another respect, the exemplary embodiment may take the form of a multi-mode dispatch communication system that includes (i) multiple dispatch client devices, (ii) a dispatch server positioned on a packet-switched network, and (iii) a radio access network that provides connectivity between the packet-switched network and at least a given one (i.e., a particular one) of the dispatch client devices. In the exemplary system, the dispatch server operates to engage in session setup signaling and floor control signaling (perhaps combined) with the dispatch client devices and to bridge communications between the dispatch client devices.

At least the given dispatch client device includes a first transceiver for engaging in air interface communications with the radio access network according to a first air interface protocol, and a second transceiver for engaging in air interface communications with local client devices according to a second air interface protocol. Further, the given dispatch client device includes control logic for bridging communications between the first transceiver and the second transceiver. As in the embodiment discussed above, the control logic preferably operates to detect energy level of second air interface protocol communications received by the second transceiver and to use the detected energy level as a basis to engage in session control signaling with the dispatch server via the first transceiver and first air interface protocol.

In this embodiment, the dispatch server operates to receive a session setup request from a first dispatch client device (of the multiple devices) and to responsively send session initiation requests to one or more other dispatch client devices including the given dispatch client device. The control logic of the given dispatch client device then operates, upon receipt of the session initiation request via the first transceiver, to determine whether the detected energy level of second air interface protocol communications received by the second transceiver meets a condition (such as a threshold low level) and (i) if so, to affirmatively respond to the dispatch server and work with the dispatch server to set up a dispatch session via the first transceiver, and to bridge first transceiver communications with second transceiver communications, so as to bridge dispatch session communications with the one or more local client devices and (ii) if not, to negatively respond to the dispatch server.

Further, the control logic operates, upon detection of threshold high energy level of second air interface protocol communications received by the second transceiver, to send to the dispatch server via the first transceiver a floor request for a new or existing dispatch communication session. In turn, if the dispatch server grants the floor request, the control logic further operates to convey second transceiver communications from the one or more other client devices to the dispatch server via the first transceiver.

As in the above embodiment, the first air interface protocol may be a wireless wide area network protocol such as iDEN, CDMA 1xRTT, CDMA 1xEV-DO, TDMA, AMPS, GSM, GPRS, UMTS, EDGE, WiMAX, or another protocol now known or later developed. Further, the second air interface protocol may be a local area network protocol such as FRS, Wi-Fi (802.11), BLUETOOTH, infrared, or another protocol now known or later developed.

In addition, also similar to the above embodiment, the given dispatch client device may operate to receive voice communications from a user of the given dispatch client device and to convey the voice communications concurrently (i) via the first transceiver over the first air interface protocol to the radio access network for transmission in turn to the dispatch server and (ii) via the second transceiver over the second air interface protocol to the one or more local client devices.

In yet another respect, the exemplary embodiment may take the form of a method carried out in a battery-operated handheld wireless communication device that has a first transceiver operable to engage in air interface communications, and a second transceiver operable to engage in air interface communications with one or more other wireless communication devices.

The method may involve (a) receiving from a dispatch server, via the first transceiver, a session initiation request message, (b) responsively determining whether energy level of communications received by the second transceiver meets a first condition (e.g., a threshold low level), and (i) if so, affirmatively responding to the dispatch server and working with the dispatch server to set up a dispatch session via the first transceiver, and bridging first transceiver communications with second transceiver communications, so as to bridge dispatch session communications with the one or more other client devices and (ii) if not, negatively responding to the dispatch server.

Further, the method may additionally involve determining that energy level of communications received by the second transceiver meets a second condition (e.g., a threshold high level), and responsively (i) transmitting via the first transceiver a floor control request to a dispatch server, and (ii) upon receipt of a floor grant in response from the dispatch server, bridging voice communications between the first transceiver and the second transceiver, so as to bridge dispatch session communications between the dispatch server and the one or more other client devices.

Still further, the method may involve receiving into the wireless communication device voice communications from a user of the wireless communication device, and transmitting the voice communications concurrently (i) via the first transceiver over the first air interface protocol to a radio access network for transmission in turn to the dispatch server and (ii) via the second transceiver over the second air interface protocol to the one or more other wireless communication devices.

2. Exemplary Network Architecture

Figure 1:
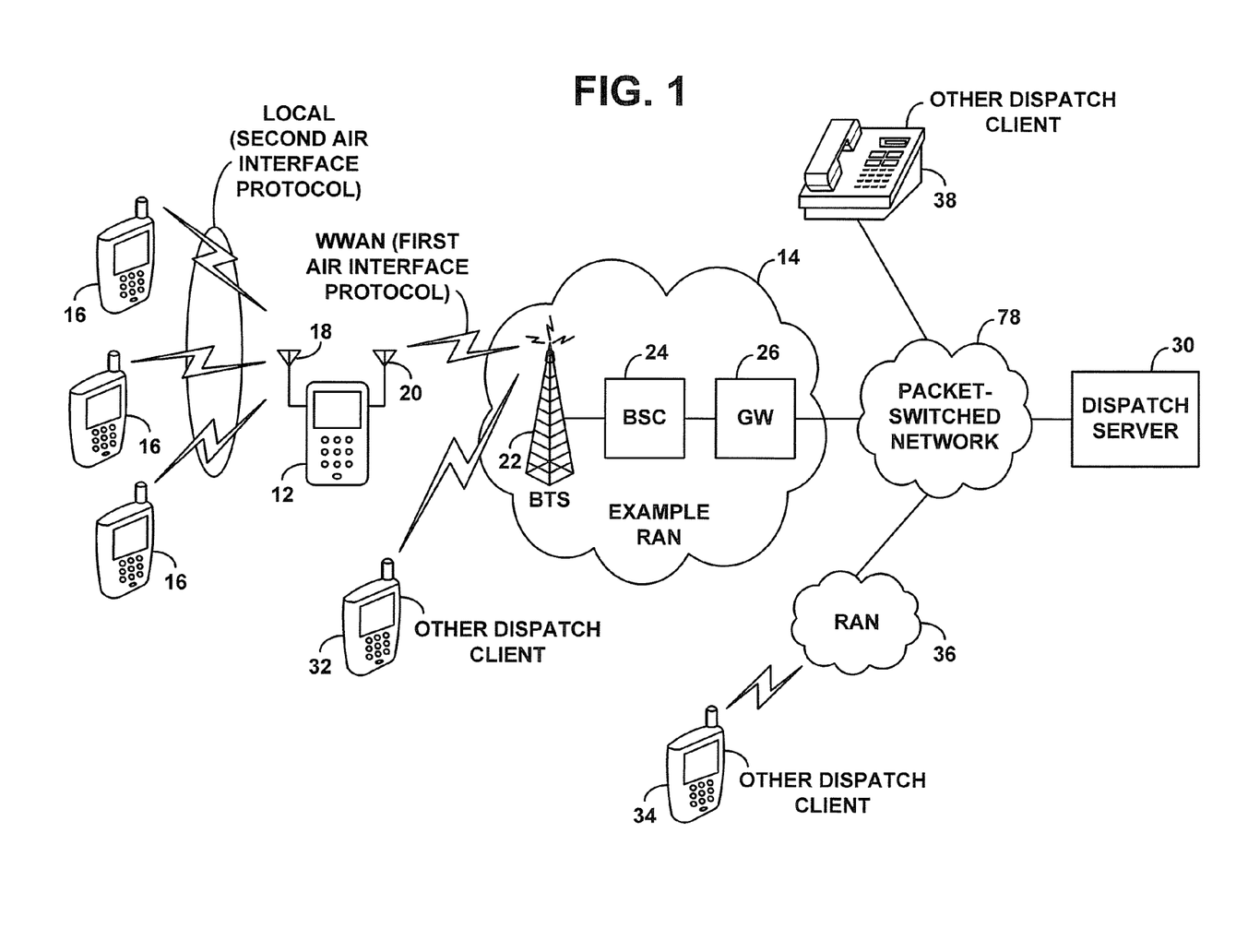
FIG. 1 is a simplified block diagram of a network in which an exemplary embodiment of the invention can be implemented.

FIG. 1 is a simplified block diagram of a communication system in which the exemplary embodiment can be implemented. It should be understood, of course, that this and other arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

The system of FIG. 1 includes a wireless communication device (WCD) 12 arranged to carry out innovative functions of the present invention. WCD 12 is an integrated multi-mode device, having at least one transceiver for wirelessly communicating with a radio access network (RAN) 14 in accordance with a first air interface protocol, and another transceiver for wirelessly communicating with other nearby devices 16 in accordance with a second air interface protocol. In FIG. 1, WCD 12 is conceptually illustrated with two antennas 18, 20, one of which may be coupled with the first transceiver and communicate wirelessly with the RAN 14, and the other of which may be coupled with the second transceiver and communicate wirelessly with the other nearby devices 16. In an alternative embodiment, WCD 12 could have more than one antenna on each side (for each transceiver), or WCD 12 could have one or more antennas shared by both transceivers. Further, WCD 12 could have more than two transceivers.

Preferably, WCD 12 and the other nearby devices 16 are all portable, handheld, battery-operated devices having device housings like conventional cell phones, suitable for being carried as a whole in a user's pocket or the like. However, any of the devices could be more complex devices, systems, or platforms if desired. Devices 16 may be single-mode devices that are merely capable of communicating with each other and with WCD 12 (and others) over the second air interface protocol. For example, devices 16 may be FRS radios (such as Motorola TALKABOUT radios, for instance). Alternatively, any or all of devices 16 may be multi-mode devices and/or may be arranged to communicate according to another second air interface protocol now known or later developed. It is also possibly that some of nearby devices 16 may communicate with WCD 12 (and perhaps each other) over one second air interface protocol, while other of the nearby devices 16 may communicate with WCD 12 (and perhaps each other) over another different second air interface protocol, in which case, WCD 12 may need to support additional protocols.

RAN 14 generally functions, preferably in a conventional manner, to serve wireless client devices such as WCD 12 and others, so as to provide those devices with resources such as the ability to communicate with other entities (or with each other) via the RAN. As such, RAN 14 may take various forms, the details of which are not critical and may depend on the first air interface protocol and on other factors.

In one embodiment, as shown, the RAN 14 may be a cellular RAN that includes a base transceiver station (BTS) 22, a base station controller (BSC) 24, and a gateway (GW) 26 such as a packet data serving node (PDSN). Generally, the BTS 22 includes an antenna arrangement and associated equipment that operates to define one or more coverage areas in which devices such as WCD 12 may communicate with the RAN 14. The BTS 22 is then coupled with BSC 24, which controls aspects of BTS operation and of air interface communication. And gateway 26 provides connectivity between the BSC 24 and a packet-switched network 28, so as to enable served client devices to communicate via the RAN 14 with entities on the packet-switched network 28. The operation of such a RAN, to facilitate wireless packet data communication between a served client device and entities on the packet-switched network 28 is well known and therefore not described here. Further, it should be understood that the RAN 14 can take numerous other forms instead, ranging from as simple as a wireless access point router to far more complex systems.

Packet-switched network 28 may include one or more networks suitable for routing packet data between network entities. Packet-switched network 28 may, for instance, include a core packet data network operated by a wireless carrier that owns and operates RAN 14. Further, packet-switched network 28 may include the Internet or other packet data networks.

Shown sitting as a node on packet-switched network 28 or otherwise accessible via packet-switched network 28 is a dispatch server 30. The dispatch server 30 preferably operates in a conventional manner to provide dispatch communication services for dispatch client devices, with the server and clients in cooperatively defining a dispatch communication system. The dispatch communication system may support voice communication, video communication, and/or other types of communication. In a preferred embodiment, the system provides push-to-talk (PTT) service, supporting voice communication between wirelessly connected dispatch client devices and/or between other sorts of dispatch client devices. In other embodiments, the system may more generally be a push-to-X system supporting communication of other media.

FIG. 1 depicts several example dispatch client devices, including a handheld wireless dispatch client device 32 served by RAN 14, another handheld wireless dispatch client device 34 served by another RAN 36, and a landline connected (e.g., desktop based) dispatch client device 38 such as a VoIP telephone coupled directly or indirectly with network 28. Further, WCD 12 functions as a dispatch client as well through communication with the dispatch server 30 via RAN 14 and network 28.

Dispatch server 30 may comprise a multipoint conference unit (MCU) and a call control server or similar functions to facilitate setup, management, and carrying of dispatch sessions among multiple parties. In a preferred embodiment, the dispatch system uses the well known Session Initiation Protocol (SIP) for session control signaling between the dispatch server 30 and served dispatch clients. However, the dispatch system could use other forms of signaling in addition or instead.

SIP generally defines an INVITE/OK/ACK transaction between a party seeking to set up a communication session with another party. The originating party first generates and transmits over a packet-switched network to the other party a SIP "INVITE" message defining proposed session parameters. If the other party agrees to participate in the session, the other party then generates and transmits to the originating party a SIP "200 OK" message, possibly also setting forth session parameters. The originating party then generates and sends to the other party a SIP "ACK" message, to complete session setup. The parties may then engage in a communication with each other in accordance with the defined session parameters. SIP may be used to set up a packet-based real-time media session such as voice or video session in accordance with the well known Realtime Transport Protocol (RTP) for instance.

For dispatch communication, a user of an originating dispatch client device, such as device 34 for instance, may press a dispatch (e.g., PTT) button on the device to initiate communication with a predefined group of other dispatch client devices, such as devices 12, 32, and 38 for instance. The originating device 34 may then programmatically generate and transmit a SIP INVITE message to the dispatch server 30, possibly indicating in the INVITE message the target group (by group ID that the server can correlate with individual other devices, or by designating each target device by device ID). Upon receipt of the INVITE message from originating device 34, the server 30 may then generate and transmit INVITE messages to each target device 12, 32, and 38, receive 200 OK messages from each target device, and generate and send ACK messages to each target device to complete setup of a session leg respectively with each target device. Further, the server may generate and send a 200 OK message to the originating device 34 and then receive from originating device 34 an ACK message to complete setup of a session leg with the originating device. The server 30 may then bridge together the various session legs to allow users of the devices to communicate with each other.

A typical dispatch system is half-duplex, allowing only one party to "talk" (or communicate other media) at once. When the session first starts, the dispatch server grants the floor to the originating party and, while that party holds the floor, any media the dispatch server receives from that party the dispatch server transmits to each other party in the session. In particular, when the server sends a 200 OK message to the originating device, the originating device may emit a floor grant tone to its user to let the user know that the user may begin talking. As the user talks, the user's device may then transmit the user's speech to the dispatch server for transmission in turn to the other session participants. At the same time, the server may disregard any media that the server receives from any party that does not hold the floor.

A user may maintain the floor by continuing to hold down the PTT button the user's device. When the user releases the button, the user's device may programmatically generate and send to the dispatch server a floor release message, such as a specially defined SIP message (or a conventional SIP message carrying data designating a floor release), which signifies to the dispatch server that the device is releasing the floor. Alternatively, the server may be arranged to automatically withdraw the floor from a party after a predefined period of time and/or when the server stops receiving media from the party.

When a user who does not hold the floor wishes to take the floor, the user may press the PTT button on the user's device, and the device may responsively generate and send to the dispatch server a floor request message, such as a specially defined SIP message (or a conventional Sip message carrying data designating a floor request), which signifies to the dispatch server that the device is requesting the floor.

If someone else currently holds the floor, the dispatch server may reject the floor request (absent some sort of priority based floor control system) by generating and sending to the requesting device a floor reject message, which can also be a specially defined SIP message or the like. In response, the requesting device may play a reject tone to its user to alert the user that the floor request has been denied, so the user would know to not try sending speech to the dispatch system.

On the other hand, if not one else currently holds the floor, the dispatch server may grant the floor request by generating and sending to the requesting device a floor grant message, which can also be a specially defined SIP message or the like. Upon receipt of the floor grant message, the requesting device may play a grant tone to its user to alert the user that the floor request has been granted, so that the user would know it is safe to start talking and that the user's speech would be transmitted to the dispatch system and in turn to the other session participants.

Figure 2:
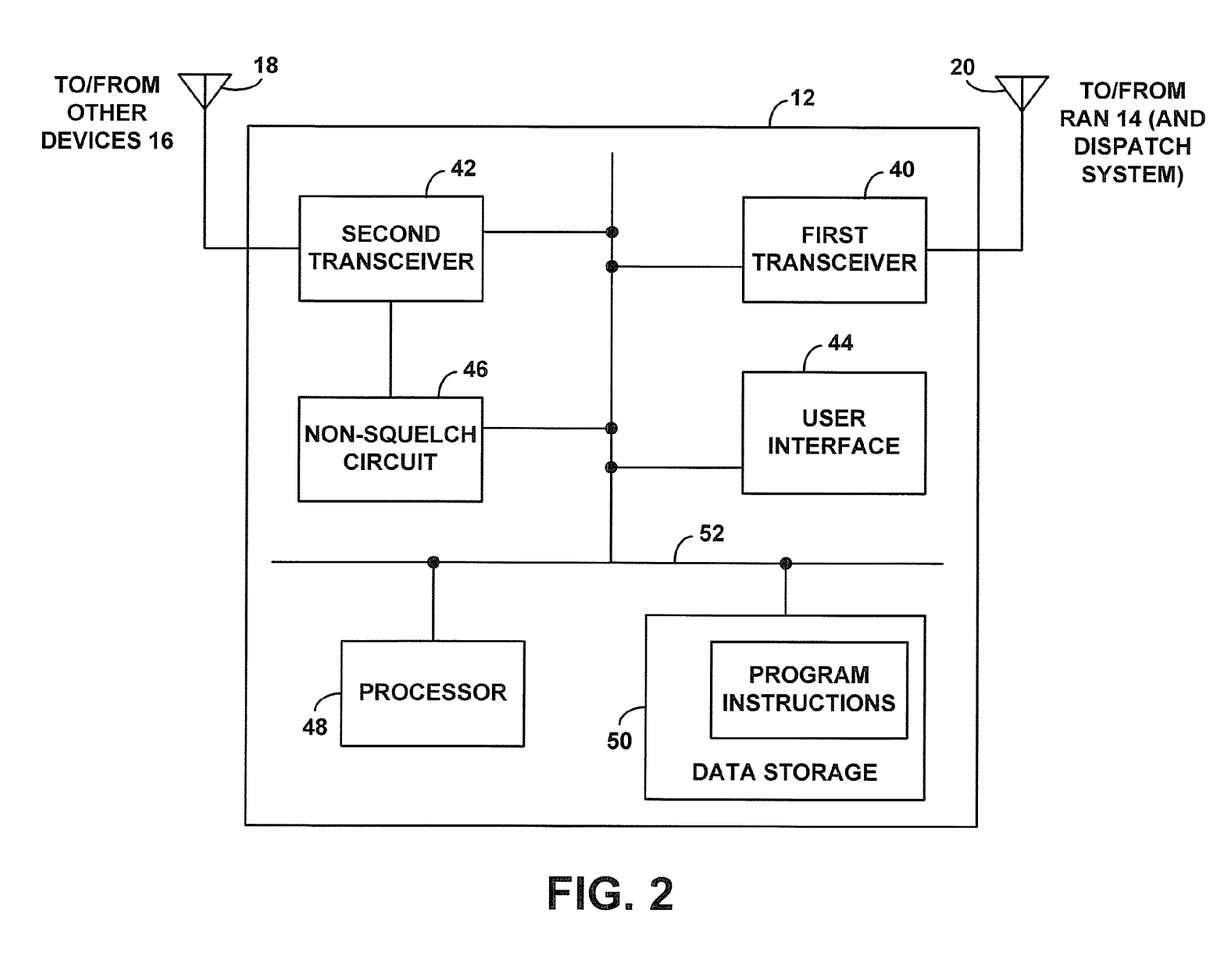
FIG. 2 is a simplified block diagram of a wireless communication device arranged to implement functions of the exemplary embodiment.

FIG. 2 is a simplified block diagram depicting components of WCD 12 arranged to operate in accordance with the exemplary embodiment. As shown, WCD 12 includes a first transceiver 40 and associated antenna for wirelessly communicating with RAN 14 using a first air interface protocol, and second transceiver 42 and associated antenna for wirelessly communicating with devices 16 using a second air interface protocol.

Further, WCD 12 includes user interface components 44 for interacting with a user of the WCD. The user interface components 44 may include components for providing output to a user, such as a loudspeaker and/or audio port and a display screen. Additionally, the user interface components 44 may include components for receiving input from a user, such as a microphone, camera, keypad, and/or touch sensitive screen. WCD 12 also includes, preferably in conjunction with second transceiver 42, a conventional non-squelch circuit 46 that provides a control signal (e.g., designated voltage level) upon detecting sufficient energy level of communications received by second transceiver 42. Normally, that control signal would be used to shut off the audible output from WCD 12. In accordance with the exemplary embodiment, however, as noted above, the control signal may additionally or alternatively be used as a basis to engage in dispatch session control signaling via the first transceiver 40.

As further shown, WCD 12 includes a processor 48 and data storage 50. Processor 48 may comprise one or more general purpose processors (e.g., INTEL microprocessors) and/or one or more special purpose processors (e.g., digital signal processors, application specific integrated circuits, etc.) Data storage 50, in turn, comprises one or more volatile and/or non-volatile storage components, such as magnetic, optical, or organic storage components, and can be integrated in whole or in part with processor 48.

Data storage 50 preferably contains program instructions (e.g., machine language instructions) that are executable by processor 48 to carry out various functions described herein. For instance, the program instructions may define some or all of the control logic operable to use the detected energy level of communications received by second transceiver 42 as a basis to engage in session control signaling with the dispatch system via first transceiver 40. The control logic may also be considered to encompass the non-squelch circuit 44 or any other mechanism that enables the device to detect the energy level of communications received by the second transceiver.

Non-squelch circuit 46 may provide an interrupt signal or the like, via a system bus 52, to processor 48, to indicate to processor 48 when a transition occurs in the non-squelch circuit control signal, such as when the non-squelch circuit begins detecting a threshold energy level of communications received by second transceiver 42, or when the non-squelch circuit stops detecting a threshold energy level of communications received by the second transceiver. Processor 48 may then programmatically take action in response to, or based upon, those indications.

3. Exemplary Operation

Figure 3:
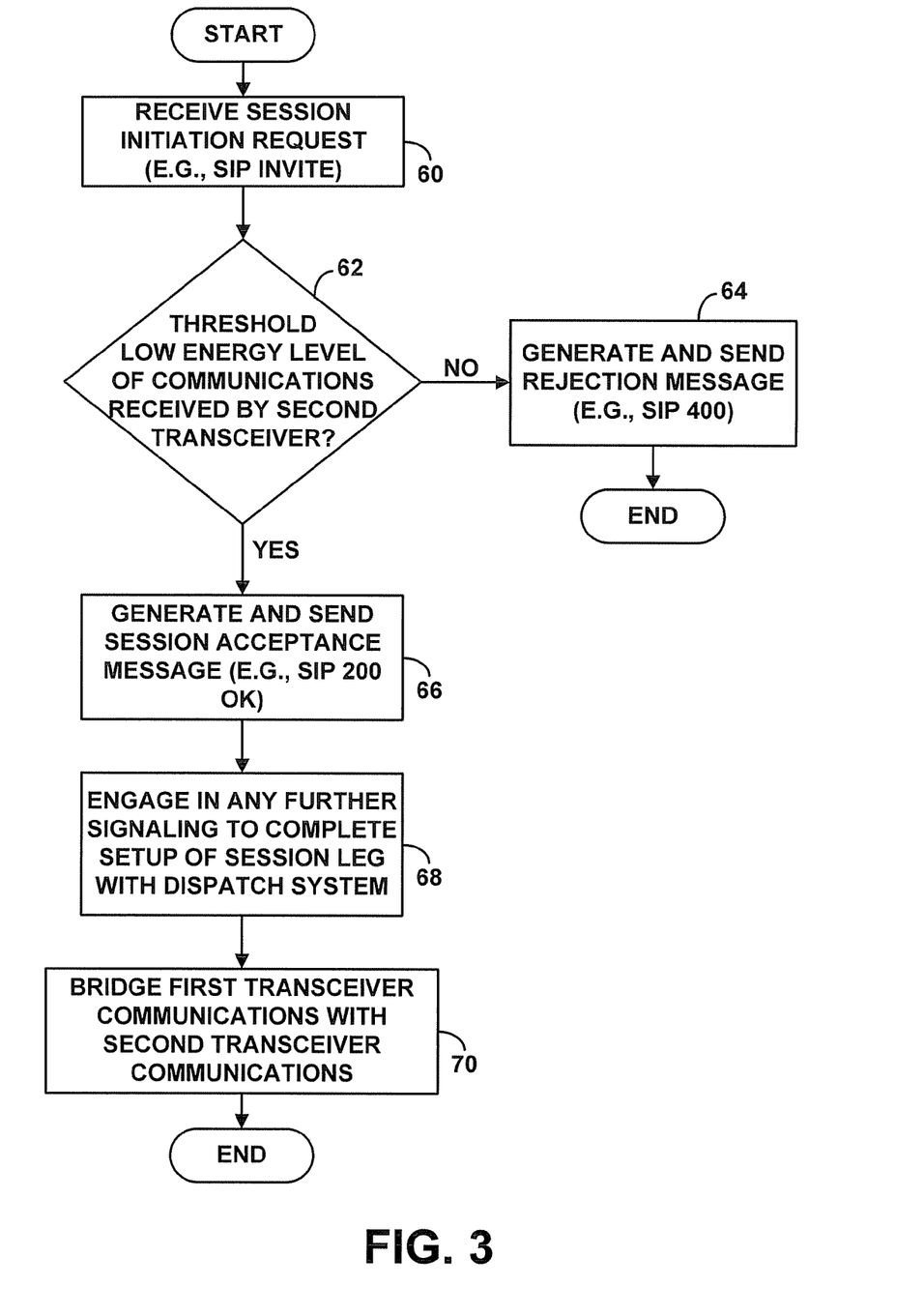
FIGS. 3, 4, and 5 are flow charts depicting functions that can be carried out in accordance with the exemplary embodiment.
Figure 4:
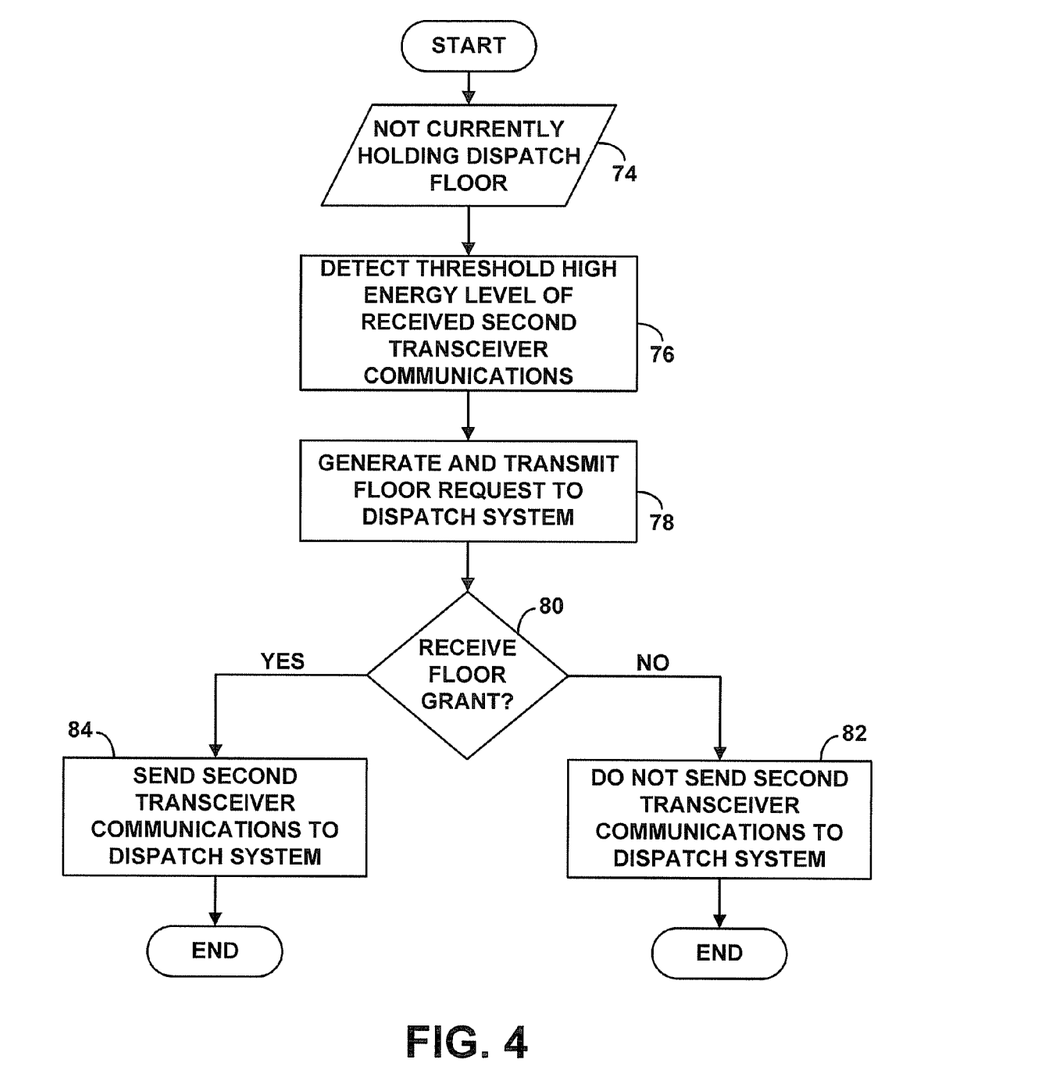
Figure 5:
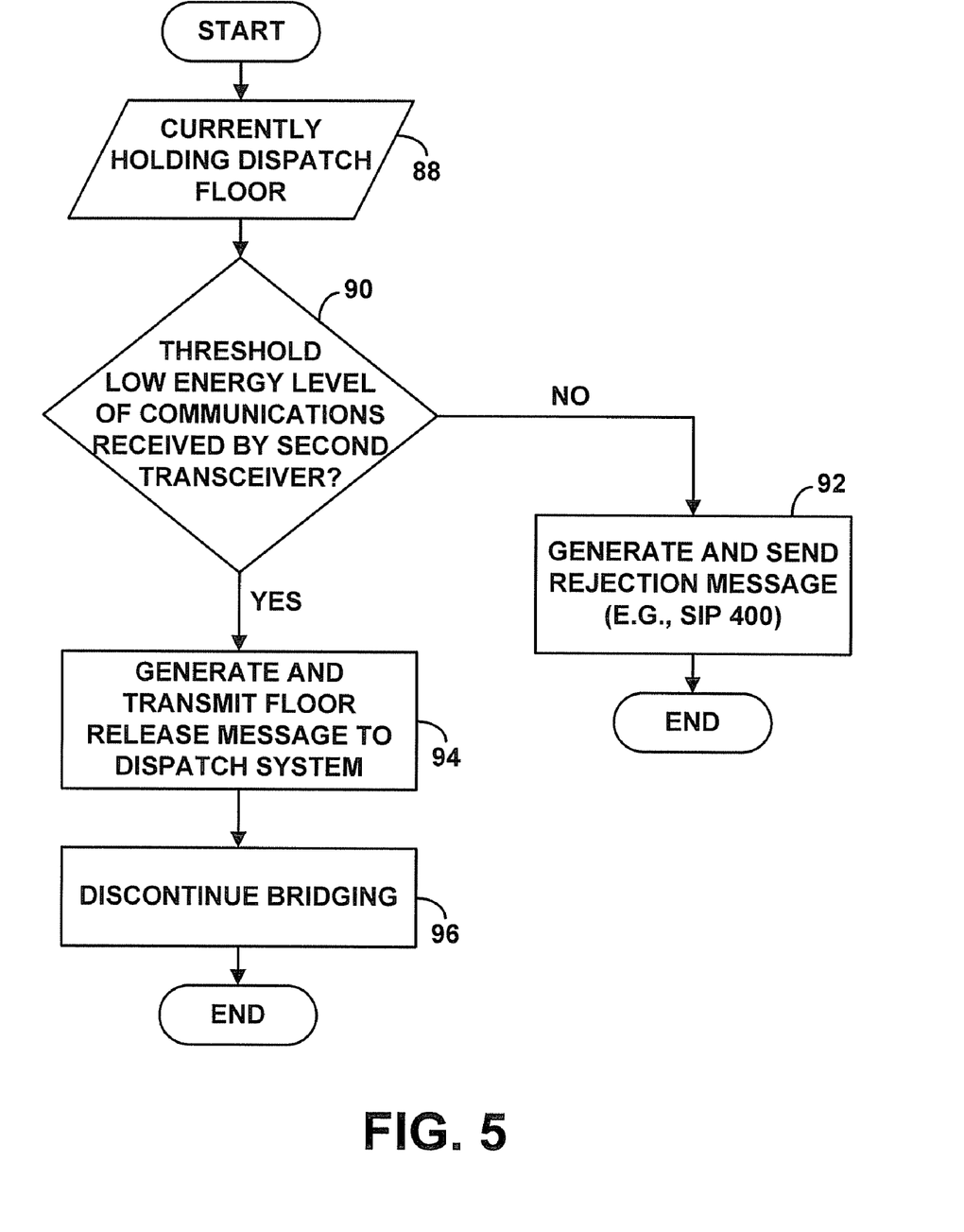

FIGS. 3, 4, and 5 are flow charts depicting functions that can be carried out by WCD 12 in accordance with the exemplary embodiment. Each of these processes assumes that WCD 12 regularly monitors the energy level of communications received by second transceiver 42, as an indication of whether communications are currently underway by any of the nearby devices 16 on the second air interface protocol. Alternatively, WCD 12 may measure and evaluate the energy level when necessary to make a determination based on the energy level, or periodically or in response to other triggering events.

FIG. 3 first depicts functions involved with WCD 12 using energy level of communications received by second transceiver 42 as a basis to intelligently respond to a dispatch session initiation message that WCD 12 receives via first transceiver 40 from the dispatch system. As shown in FIG. 3, at block 60, WCD 12 receives a dispatch session initiation message such as a SIP INVITE message, via first transceiver 40, where the message was transmitted by dispatch server 30 in response to a session initiation request by another dispatch client (or if the session was scheduled to be started automatically).

At block 62, in response to receipt of the dispatch session initiation message, processor 48 applies control logic to determine whether the energy level of communications received by second transceiver 42 is a threshold low level. For instance, processor 48 may determine whether a control signal from non-squelch circuit 46 indicates that less than a designated threshold level of energy is being received by the second transceiver.

If processor 48 thereby determines that the energy level of communications received by second transceiver 42 is not a threshold low level, then, at block 64, processor 48 generates and transmits via first transceiver 40 and RAN 14 to dispatch server 30 a rejection message, such as a SIP 400 series message indicating that WCD 42 is busy or otherwise unwilling to accept the dispatch session invitation.

On the other hand, if processor 48 determines at block 62 that the energy level of communications received by second transceiver 42 is a threshold low level, then, at block 66, the processor generates and transmits via first transceiver 40 and RAN 14 to dispatch server an acceptance message such as a SIP 200 OK message. And at block 68, processor 48 may receive a SIP ACK message via first transceiver 40 and RAN 12 from the dispatch server, completing setup of a dispatch session leg between WCD 12 and the dispatch server.

Further, at block 70, processor 48 then carries out one or more bridging functions to bridge air interface communications by first transceiver 40 with air interface communications by second transceiver 42 and perhaps further with communications by a user of WCD 12. For instance, as WCD 12 receives media conveyed from dispatch server 30 (originated from the party who currently holds the floor), processor 48 may transmit that media via second transceiver 42 for receipt by other nearby devices 16. In addition, processor 48 may output that media for receipt by a user of WCD 12. Still further, if WCD 12 subsequently holds the floor, processor 48 may convey via first transceiver 40 to dispatch server any media received by second transceiver 42 from other devices 16, and processor 48 may further convey via first transceiver 40 to dispatch server media that WCD 12 receives via user interface 44 from a user of WCD 12.

FIG. 4 next depicts functions involved with WCD 12 using energy level of communications received by second transceiver 42 as a basis to intelligently generate and transmit a floor request message to the dispatch system. As shown in FIG. 4, at block 74, the process begins with WCD 12 not currently holding the floor in a dispatch session. (Further, the process may involve WCD 12 detecting that no one else currently holds the floor in the dispatch session, such as by having received a signaling message from the dispatch server indicating that no one else holds the floor, or by not receiving a signaling message from the dispatch server indicating that someone else holds the floor.)

At block 76, processor 48 applies control logic to determine that the energy level of communications received by second transceiver 42 has transitioned to a threshold high level. For instance, processor 48 may determine that a control signal from non-squelch circuit 46 indicates that at least a designated threshold level of energy is now being received by the second transceiver. In response, at block 78, processor 48 then generates and transmits via the first transceiver 40 and RAN 14 to dispatch server 30 a floor request message, seeking to acquire the floor in the dispatch session or, if no such session exists yet, seeking to initiate a dispatch session.

At block 80, processor 48 then determines whether it receives a floor grant message in response, via first transceiver 40 and RAN 14, from dispatch server 30. For instance, processor 48 may wait for its floor request to timeout without receiving a reply, or processor 48 may receive an express floor grant or floor rejection message transmitted from dispatch server 30.

If processor 48 does not receive a floor grant (e.g., processor 48 receives a floor rejection message), then, at step 82, processor 48 may programmatically not bridge first transceiver communications with second transceiver communications (and further with user communications). In the event processor 48 had already begun such bridging, processor may discontinue doing so. On the other hand, if processor 48 receives a floor grant message from dispatch server 30, then, at step 84, processor may bridge first transceiver communications with second transceiver communications (and perhaps further with user communications) as described above for instance.

FIG. 5 next depicts functions involved with WCD 12 using energy level of communications received by second transceiver 42 as a basis to intelligently generate and transmit a floor release message to the dispatch system. As shown in FIG. 5, at block 88, the process begins with WCD 12 currently holding the floor in a dispatch session. Presumably, WCD 12 would hold the floor in the dispatch session in response to having detected sufficient energy level of communications received by second transceiver 42 and responsively requesting and acquiring the floor, or in response to a user of WCD 12 having pressed the PTT button on WCD 12 and the conventional floor acquisition process occurring. WCD 12 may hold the floor for other reasons as well.

At block 90, processor 48 then applies control logic to determine whether the energy level of communications received by second transceiver 42 has transitioned to be below a threshold low level. For instance, processor 48 may determine whether a control signal from non-squelch circuit 46 indicates that less than a designated threshold level of energy is now being received by the second transceiver.

If processor 48 thereby determines that the energy level of communications received by second transceiver 42 is not a threshold low level, then, at block 92, processor 48 maintains the floor in the dispatch session, i.e., processor 48 need not take any special action. On the other hand, if processor 48 thereby determines that the energy level of communications received by second transceiver 42 transitions to a threshold low level, then, at block 94, processor 48 generates and transmits via first transceiver and RAN 14 to dispatch server 30 a floor release message, to release the dispatch session floor, and, at block 96, the processor stops bringing communications between communications between the transceivers. Preferably, this process assumes that a user of WCD is not currently talking; if a user is talking and has the PTT button engaged, then processor 48 would preferably not send a floor release message.

As noted above, the exemplary embodiment can advantageously allow a user at a construction site or in some other environment to easily connect local wireless communications with wide area dispatch communications. A user may, for instance, carry WCD 12 in a pocket or on a belt, and WCD 12 may function as described above to intelligently interoperate between wireless communications with nearby devices and wireless communications with a dispatch system.

4. Conclusion

An exemplary embodiment of the invention has been described above. Those of ordinary skill in the art will appreciate, however, that modifications may be made while remaining within the scope of the invention as defined by the claims.

We claim:

1. A client device comprising, within a device housing:
   a first transceiver operative according to a first air interface protocol to wirelessly communicate with a radio access network providing connectivity with a dispatch communication system;
   a second transceiver operative according to a second air interface protocol to wirelessly communicate with one or more other client devices, wherein the second air interface protocol is different than the first air interface protocol; and
   control logic for bridging communications between the first transceiver and the second transceiver, wherein the control logic is operative to detect energy level of second air interface protocol communications received by the second transceiver and to use the detected energy level as a basis to engage in floor control signaling with the dispatch communication system via the first transceiver and first air interface protocol,
   wherein the control logic is operative, upon detection of a threshold high energy level of second air interface protocol communications received by the second transceiver, to automatically generate a floor request message for a dispatch communication session and to send the floor request message via the first transceiver to the dispatch communication system, and
   wherein, if the dispatch communication system grants the floor request, the control logic is further operative to transmit via the first transceiver to the dispatch communication system communications that the client device receives via the second transceiver from the one or more other client devices.

2. The client device of claim 1,
   wherein the first air interface protocol comprises a wireless wide area network protocol selected from the group consisting of iDEN, CDMA 1xRTT, CDMA 1xEV-DO, TDMA, AMPS, GSM, GPRS, UMTS, EDGE, and WiMAX; and
   wherein the second air interface protocol comprises a wireless local area network protocol selected from the group consisting of FRS, Wi-Fi (802.11), BLUETOOTH, and infrared.

3. The client device of claim 1, wherein the communications comprise voice communications.

4. The client device of claim 1, wherein the control logic comprises a non-squelch circuit operative to detect energy level of the of air interface communications received by the second transceiver.

5. The client device of claim 1, further operative to receive voice communications from a user of the client device and to convey the voice communications concurrently (i) via the first transceiver over the first air interface protocol to the radio access network for transmission in turn to the dispatch communication system and (ii) via the second transceiver over the second air interface protocol to the one or more other client devices.

6. The client device of claim 1, wherein the client device is a portable, battery-operated, handheld device.

7. The client device of claim 1,
   wherein the control logic is operative, upon receipt of a session initiation request via the first transceiver from the dispatch communication system, to automatically determine whether the detected energy level of second air interface protocol communications received by the second transceiver is lower than a minimum threshold and (i) if so, to generate and transmit to the dispatch communication system via the first transceiver an affirmative response message, to engage in further signaling via the first transceiver with the dispatch communication system so as to set up a dispatch session via the first transceiver, and transmit via the second transceiver dispatch session communications that the client device receives via the first transceiver, for receipt of the dispatch session communications by the one or more other client devices, and (ii) if not, to generate and transmit to the dispatch communication system via the first transceiver a negative response;
   and
   wherein the client device is further operative to receive voice communications from a user of the client device and to convey the voice communications concurrently (i) via the first transceiver over the first air interface protocol to the radio access network for transmission in turn to the dispatch communication system and (ii) via the second transceiver over the second air interface protocol to the one or more other client devices.

8. The client device of claim 7,
   wherein the first air interface protocol comprises a wireless wide area network protocol selected from the group consisting of iDEN, CDMA 1xRTT, CDMA 1xEV-DO, TDMA, AMPS, GSM, GPRS, UMTS, EDGE, and WiMAX, and
   wherein the second air interface protocol comprises a wireless local area network protocol selected from the group consisting of FRS, Wi-Fi (802.11), BLUETOOTH, and infrared.

9. The client device of claim 8, wherein the client device is a portable, battery-operated, handheld device.

10. The client device of claim 9, wherein the control logic comprises a non-squelch circuit operative to detect energy level of the of air interface communications received by the second transceiver.

11. The client device of claim 1,
wherein the control logic is operative, when the client device holds a floor of a dispatch communication session via the first transceiver, to detect a threshold low energy level of second air interface protocol communications received by the second transceiver and to responsively generate and send via the first transceiver to the dispatch communication system a floor release message.

12. A multi-mode dispatch communication system comprising:
a plurality of dispatch client devices, including a given dispatch client device;
a dispatch server disposed on a packet-switched network and operable to engage in session setup signaling and floor control signaling with the dispatch client devices and to bridge communications between the dispatch client devices; and
a radio access network providing connectivity between the packet-switched network and at least the given dispatch client device,
wherein the given dispatch client device includes a first transceiver for engaging in air interface communications with the radio access network according to a first air interface protocol and a second transceiver for engaging in air interface communications with local client devices according to a second air interface protocol, and
wherein the given dispatch client device includes control logic for bridging communications between the first transceiver and the second transceiver, wherein the control logic operates to detect energy level of second air interface protocol communications received by the second transceiver and to use the detected energy level as a basis to engage in floor control signaling with the dispatch server via the first transceiver and first air interface protocol,
wherein the control logic of the given dispatch client device is operative, upon detection of a threshold high energy level of second air interface protocol communications received by the second transceiver, to send to the dispatch server via the first transceiver a floor request for a dispatch communication session, and
wherein, if the dispatch server grants the floor request, the control logic is further operative to convey second transceiver communications from the one or more other client devices to the dispatch server via the first transceiver.

13. The system of claim 12,
wherein the first air interface protocol comprises a wireless wide area network protocol selected from the group consisting of iDEN, CDMA 1xRTT, CDMA 1xEV-DO, TDMA, AMPS, GSM, GPRS, UMTS, EDGE, and WiMAX, and
wherein the second air interface protocol comprises a wireless local area network protocol selected from the group consisting of FRS, Wi-Fi (802.11), BLUETOOTH, and infrared.

14. The system of claim 12,
wherein the given dispatch client device is further operative to receive voice communications from a user of the given dispatch client device and to convey the voice communications concurrently (i) via the first transceiver over the first air interface protocol to the radio access network for transmission in turn to the dispatch server and (ii) via the second transceiver over the second air interface protocol to the one or more local client devices.

15. The system of claim 14, wherein the given dispatch client device is a portable, battery-operated, handheld device.

16. A multi-mode dispatch communication system comprising:
a plurality of dispatch client devices, including a given dispatch client device;
a dispatch server disposed on a packet-switched network and operable to engage in session setup signaling and floor control signaling with the dispatch client devices and to bridge communications between the dispatch client devices; and
a radio access network providing connectivity between the packet-switched network and at least the given dispatch client device,
wherein the given dispatch client device includes a first transceiver for engaging in air interface communications with the radio access network according to a first air interface protocol and a second transceiver for engaging in air interface communications with local client devices according to a second air interface protocol, and
wherein the given dispatch client device includes control logic for bridging communications between the first transceiver and the second transceiver, wherein the control logic operates to detect energy level of second air interface protocol communications received by the second transceiver and to use the detected energy level as a basis to engage in floor control signaling with the dispatch server via the first transceiver and first air interface protocol,
wherein the dispatch server is operable to receive a session setup request from a first dispatch client device of the plurality of dispatch client devices and to responsively send session initiation requests to one or more other dispatch client devices including the given dispatch client device,
wherein the control logic of the given dispatch client device is operable to receive the session initiation request via the first transceiver, to determine whether the detected energy level of second air interface protocol communications received by the second transceiver meets a condition and (i) if so, to affirmatively respond to the dispatch server and work with the dispatch server to set up a dispatch session via the first transceiver, and to bridge first transceiver communications with second transceiver communications, so as to bridge dispatch session communications with the one or more local client devices and (ii) if not, to negatively respond to the dispatch server.

17. In a battery-operated handheld wireless communication device having a first transceiver operable to engage in air interface communications, and having a second transceiver operable to engage in air interface communications with one or more other wireless communication devices, a method comprising:
receiving from a dispatch server and via the first transceiver a session initiation request message, responsively determining whether energy level of communications received by the second transceiver meets a first condition, and (i) if so, affirmatively responding to the dispatch server and working with the dispatch server to set up a dispatch session via the first transceiver, and bridging first transceiver communications with second transceiver communications, so as to bridge dispatch session communications with the one or more other client devices and (ii) if not, negatively responding to the dispatch server; and determining that energy level of communications received by the second transceiver meets a second condition, and responsively (i) transmitting via the first transceiver a floor control request to a dispatch server, and (ii) upon receipt of a floor grant in response from the dispatch server, bridging voice communications between the first transceiver and the second transceiver, so as to bridge dispatch session communications between the dispatch server and the one or more other client devices.

18. The method of claim 17, further comprising:

receiving into the wireless communication device voice communications from a user of the wireless communication device; and transmitting the voice communications concurrently (i) via the first transceiver over the first air interface protocol to a radio access network for transmission in turn to the dispatch server and (ii) via the second transceiver over the second air interface protocol to the one or more other wireless communication devices.

19. A client device comprising, within a device housing:

a first transceiver operative according to a first air interface protocol to wirelessly communicate with a radio access network providing connectivity with a dispatch communication system;

a second transceiver operative according to a second air interface protocol to wirelessly communicate with one or more other client devices, wherein the second air interface protocol is different than the first air interface protocol; and control logic for bridging communications between the first transceiver and the second transceiver, wherein the control logic is operative to detect energy level of second air interface protocol communications received by the second transceiver and to use the detected energy level as a basis to engage in floor control signaling with the dispatch communication system via the first transceiver and first air interface protocol, wherein the control logic is operative, upon receipt of a session initiation request via the first transceiver from the dispatch communication system, to automatically determine whether the detected energy level of second air interface protocol communications received by the second transceiver is lower than a minimum threshold and:

(i) if so, to generate and transmit to the dispatch communication system via the first transceiver an affirmative response message, to engage in further signaling via the first transceiver with the dispatch communication system so as to set up a dispatch session via the first transceiver, and transmit via the second transceiver dispatch session communications that the client device receives via the first transceiver, for receipt of the dispatch session communications by the one or more other client devices, and (ii) if not, to generate and transmit to the dispatch communication system via the first transceiver a negative response.

* * * * *